Sept. 22, 1925.

J. RENNING

ELECTRIC STOVE FOR RAPID HEATING

Filed June 3, 1924

1,554,829

Inventor:
Julius Renning

Patented Sept. 22, 1925.

1,554,829

UNITED STATES PATENT OFFICE.

JULIUS RENNING, OF MUNICH, GERMANY.

ELECTRIC STOVE FOR RAPID HEATING.

Application filed June 3, 1924. Serial No. 717,510.

*To all whom it may concern:*

Be it known that I, JULIUS RENNING, a citizen of the German Republic, residing at Munich, Germany, have invented certain new and useful Improvements in Electric Stoves for Rapid Heating, of which the following is a specification.

This invention relates to an electric stove for rapid heating in which in a frame, open at the bottom, a heating frame with heating coils and an outer envelope enclosing these parts is arranged, so that the atmospheric air can get to the heating bodies from below to flow along the same and to flow out at the upper end of the stove.

This invention has for its object to retain the air, which flows from below through the perforated bottom plate of the stove along the heating bodies, for the longest possible time in the stove and to conduct the same through the stove on a very long path so that the air after having been heated heats several parts of the stove and by radiation of heat also the ambient air. The stove is consequently constructed in such a manner that the hot air ascending from the heating bodies travels through long narrow spaces enclosed by walls and presenting a very large surface. The outer casing of the stove has apertures through which the outer air is admitted to come in contact with the heated surfaces so that it is heated. With this object in view a heating chamber comprising a convenient number of compartments, arranged after the kind of chemical dephlegmators, said compartments being connected with one another by short tubular connections. In these compartments distributing plates are arranged in such a manner that they force the heated ascending air to flow in the compartment to all sides and along all the surfaces of the compartment and the partition.

An embodiment of the invention is shown by way of example on the accompanying drawing, in which.

Figure 1:
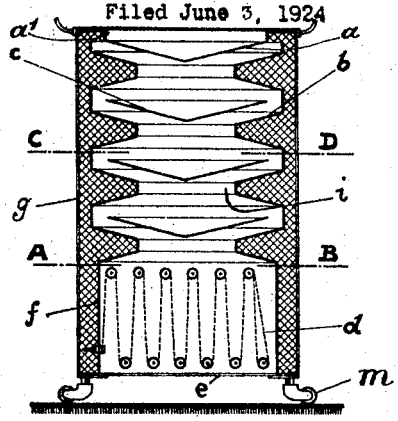
Fig. 1 shows the electric stove in vertical section on line E—F of Fig. 2.
Figure 2:
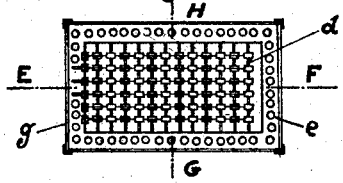
Fig. 2 is a horizontal section on line A—B of Fig. 1.
Figure 4:
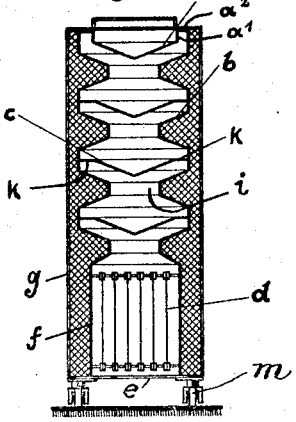

Fig. 4 a vertical section on line H—G of Fig. 2.

Figure 3:
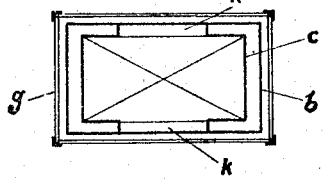
Fig. 3 is a horizontal section on line C—D of Fig. 1.

The outer frame $e$, mounted on feet with rollers $m$, is of angular, circular, or oval cross section and carries on its bottom plate the heating frame $f$ and an envelope $g$ made from perforated sheet metal reinforced with angle irons, or from Dutch tiles. Between the heating frame $f$ and the envelope a space is left for the outer air which flows in through the perforations of the envelope, or when the same is made from Dutch tiles, through slits provided in said envelope the air flowing then around the heating frame. In the heating frame $f$ the heating body $d$, consisting of grid-like free heating wires, is arranged. According to the invention the envelope extends at the upper end above the heating frame and forms compartments $b$ with downwardly inclined bottom surfaces and upwardly inclined upper surfaces, said compartments $b$ communicating through central tubular connections $i$. In each compartment $b$ a distributing plate $c$ is arranged so that its edge does not touch the wall of the compartment at any point, with the exception of two flaps $k$ (Figs. 3 and 4), by means of which the distributing plate is fixed. The distributing plates are made from sheet metal and are of such a shape that from the centre of the stove they extend parallel to the nearest lower surfaces of the compartment. The upper compartment is only half as high as the others and covered by a cover plate mounted in an angle iron frame and placed upon the top edge of the envelope $g$. The distributing plate $a$ of the upper compartment has an annular, vertically directed flange $a'$ designed to engage with a slit of the cover plate. The two short sides of the upwardly directed flange $a'$ of the distributing plate are connected with the edge of the slit of the cover plate and the two long sides are connected with the inner surface of the envelope by horizontal flanges $a^2$ so that the upper chamber is closed at the top by the cup-shaped distributing plate designed to serve for evaporating water. When the envelope $g$ is made from Dutch tiles, a similar cavity may be provided in the top plate of the stove.

I claim:—

Electric stove for rapid heating comprising in combination a casing, an envelope of Dutch tile open at both ends mounted on the bottom plate of said casing and lining the four sides of the same, a heating frame forming in the lower part a heating chamber and in the upper part superposed heating compartments communicating at the centre with one another, a heating frame in the heating chamber, a heating body consisting of heating wire arranged in said heating frame, distributing plates in each compartment, said compartments and the distributing plates being shaped like chemical dephlegmators, and a cup-shaped top plate closing the envelope at the upper end so that the air flowing in through the bottom part of the stove and through the envelope of wire gauze comes in contact with large surfaces before it flows off at the upper end of the stove.

In testimony whereof I affix my signature.

JULIUS RENNING.